(12) United States Patent
Nobukiyo

(10) Patent No.: US 9,078,273 B2
(45) Date of Patent: Jul. 7, 2015

(54) BASE STATION, COMMUNICATION TERMINAL, USABLE RADIO RESOURCE SETTING METHOD, AND BASE STATION CONTROL PROGRAM

(75) Inventor: Takahiro Nobukiyo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 472 days.

(21) Appl. No.: 13/518,252

(22) PCT Filed: Dec. 9, 2010

(86) PCT No.: PCT/JP2010/072597
§ 371 (c)(1),
(2), (4) Date: Jun. 21, 2012

(87) PCT Pub. No.: WO2011/078039
PCT Pub. Date: Jun. 30, 2011

(65) Prior Publication Data
US 2012/0264472 A1 Oct. 18, 2012

(30) Foreign Application Priority Data
Dec. 24, 2009 (JP) ................................ 2009-292017

(51) Int. Cl.
*H04B 7/00* (2006.01)
*H04W 72/10* (2009.01)
(Continued)

(52) U.S. Cl.
CPC ............ *H04W 72/10* (2013.01); *H04W 72/082* (2013.01); *H04W 72/08* (2013.01); *H04W 88/08* (2013.01)

(58) Field of Classification Search
CPC ... H04W 72/10; H04W 72/08; H04W 72/082; H04W 72/0453; H04W 72/04
USPC ......... 455/509, 511, 512, 514, 515, 500, 517, 455/67.11, 445, 507, 561, 436–444, 455/414.1–414.4, 403, 422.1, 432.1–432.3, 455/550.1, 426.1, 426.2, 522, 69, 68, 450, 455/452.1, 452.2; 370/328, 329, 338, 331, 370/343, 332
See application file for complete search history.

(56) References Cited

U.S. PATENT DOCUMENTS

2006/0073833 A1* 4/2006 Hamalainen et al. ......... 455/447
2007/0249361 A1 10/2007 Klang et al.
2010/0085924 A1 4/2010 Hamabe et al.

FOREIGN PATENT DOCUMENTS

CN 101518114 A 8/2009
JP 2007-533224 A 11/2007
WO 2008/035661 A1 3/2008

OTHER PUBLICATIONS

Chttl, Itri, "Identify Cell Edge Users by Using Maximum RSRP Trigger Threshold in ICIC Operation", 3GPP TSG-RAN WG1 #56, R1-090955, 3GPP Feb. 9, 2009, 3 pp.

(Continued)

*Primary Examiner* — Keith Ferguson
(74) *Attorney, Agent, or Firm* — Sughrue Mion, PLLC

(57) ABSTRACT

Provided is a setting method for the usable resource for a communication terminal which, while suppressing an inter-adjacent-cell interference, improves a selection flexibility for a band for the communication terminal subjected to a strong influence of the adjacent-cell interference. A base station, which performs radio communications with a communication terminal within a main communication area, includes: a priority band setting unit that sets a main priority radio resource that can be used for the main communication area on a higher priority basis than for a communication area adjacent to the main communication area, and acquires a particular priority radio resource that can be used for at least one particular communication area adjacent to the main communication area on a higher priority basis than for a communication area adjacent to the at least one particular communication area; and a usable band setting unit that acquires a communication quality difference regarding the communication terminal between communication quality related to the main communication area and communication quality related to the at least one particular communication area, and sets the main priority radio resource to which at least one particular priority radio resource is added, as usable radio resources for the communication terminal when at least one condition that the communication quality difference is larger than a threshold value is fulfilled.

15 Claims, 15 Drawing Sheets

(51) Int. Cl.
*H04W 72/08* (2009.01)
*H04W 88/08* (2009.01)

(56) References Cited

OTHER PUBLICATIONS

Huawei, "Soft Frequency Reuse Scheme for UTRAN LTE", 3GPP TSG RAN WG1 Meeting #41, R1-050507, 3GPP, May 9, 2005, 6 pp.
Nokia Siemens Networks, Nokia, "Performance analysis and simulation results of Uplink ICIC", 3GPP TSG RAN WG1 #51 bis Meeting, R1-080331 3GPP, Jan. 14, 2008, 5 pp.
Ericsson, "On Inter-cell Interference Coordination Schemes without/with Traffic Load Indication", 3GPP TSG-RAN WG1 Meeting #50-bis, R1-074444, 3GPP, Oct. 8, 2007, 6 pp.
Chttl, Itri, "Performance Evaluation of User Grouping Methods for Downlink Soft Frequency Reuse", 3GPP TSG-RAN WG1 #53bis, R1-082578, 3GPP, Jun. 30, 2008, 5 pp.
3GPP TS 36.300 V8.9.0, Jun. 2009, 3GPP TSG RAN E-UTRA and E-UTRAN Overall description, pp. 86.
Freescale Semiconductor, "Performance evaluation of uplink interference avoidance techniques", 3GPP TSG RAN R1-06928, 5 pp.
3GPP TS 36.423 V8.6.0, Jun. 2009, 3GPP TSG RAN EUTRAN X2AP, pp. 27.
International Search Report for PCT/JP2010/072597 dated Jan. 25, 2011.
Communication dated Apr. 14, 2014 from the State Intellectual Property Office of the People's Republic of China in counterpart Chinese application No. 201080057490.9.

\* cited by examiner

701

| No. | CELL NUMBER j | Diff_RSRP(j) [dB] |
|---|---|---|
| 1 | C42 | 15.0 |
| 2 | C33 | 29.0 |
| 3 | C13 | 31.0 |
| 4 | C12 | 35.0 |
| 5 | C32 | 38.0 |
| 6 | C23 | 41.0 |

702

| No. | CELL NUMBER j | Diff_RSRP(j) [dB] |
|---|---|---|
| 1 | C42 | 1.5 |
| 2 | C33 | 11.0 |
| 3 | C13 | 12.0 |
| 4 | C12 | 30.0 |
| 5 | C32 | 31.0 |
| 6 | C23 | 35.0 |

703

| No. | CELL NUMBER j | Diff_RSRP(j) [dB] |
|---|---|---|
| 1 | C42 | 3.5 |
| 2 | C33 | 3.5 |
| 3 | C13 | 20.0 |
| 4 | C32 | 21.0 |
| 5 | C12 | 31.0 |
| 6 | C23 | 35.0 |

| GROUP No. | PRIORITY BAND | CELL NUMBER j | Diff_RSRP(j) [dB] |
|---|---|---|---|
| 1 | f2 | C12 | 30.0 |
| | | C32 | 31.0 |
| | | C42 | 1.5 |
| 2 | f3 | C13 | 12.0 |
| | | C23 | 35.0 |
| | | C33 | 11.0 |

FIG. 14

BASE STATION, COMMUNICATION TERMINAL, USABLE RADIO RESOURCE SETTING METHOD, AND BASE STATION CONTROL PROGRAM

CROSS REFERENCE TO RELATED APPLICATIONS

This application is a National Stage of International Application No. PCT/JP2010/072597 filed Dec. 9, 2010, claiming priority based on Japanese Patent Application No. 2009-292017 filed Dec. 24, 2009, the contents of all of which are incorporated herein by reference in their entirety.

TECHNICAL FIELD

This invention relates to a communication technology that allows communication terminals to perform communications with each other via one or a plurality of base stations placed within a communication area.

BACKGROUND ART

In a cellular communication technology, a base station manages one or more communication areas, and performs radio communications with a communication terminal within the communication area. The communication area is called "cell", and the same radio band is generally used within one cell. Therefore, in a case where the communication terminal performs communications by using the same radio resource as that of an adjacent cell thereto, the communication terminal receives strong interference (hereinafter, referred to as "adjacent-cell interference") from the adjacent cell.

For example, in an uplink, in a case where communication terminals in a vicinity of a cell boundary with respect to the adjacent cell simultaneously perform transmission by using the same radio resource, a level difference between a desired signal and the adjacent-cell interference is small, which leads to a problem that communication quality greatly deteriorates. Similarly in a downlink, assuming that, for example, transmission power of the respective cells are constant, the terminal in the vicinity of the cell boundary has a small level difference between the desired signal received by the terminal and the adjacent-cell interference, which leads to a problem that the communication quality greatly deteriorates. Further, in the radio communications, shadowing that causes a radio wave strength to vary occurs also due to a radio wave covered or reflected by a building or the like, and hence from the viewpoint of the adjacent-cell interference, a cell that is not geographically adjacent can be the adjacent cell.

For example, in a next-generation high-speed mobile communication technology (long term evolution (LTE)) defined by a standardization project for a third-generation mobile communication system (3rd Generation Partnership Project (3GPP)), application of inter-cell interference coordination (ICIC) is expected as a technology for solving the problem of the adjacent-cell interference (Non Patent Literature 1). ICIC has an object to control inter-adjacent-cell interference, and describes that it is necessary to consider information obtained from another cell, such as a resource usage status, a traffic load, and the like. Further, as one of a method of implementing ICIC, there is a frequency reuse (fractional frequency reuse (FFR)) technology. In FFR, separate priority bands are set for the respective cells.

The base station uses communication quality information reported from a communication terminal to determine whether the communication terminal is a communication terminal subjected to a weak influence of the adjacent-cell interference (hereinafter, referred to as "center terminal") or a communication terminal subjected to a strong influence of the adjacent-cell interference (hereinafter, referred to as "edge terminal"). Then, restriction of a usable band is avoided when the communication terminal is determined as the center terminal, while the usable band is restricted to the priority band for a local cell when the communication terminal is determined as the edge terminal. A scheduler allocates radio resources based on channel quality from among bands that can be used by respective communication terminals (Non Patent Literature 2).

Note that, as a method of causing base stations to notify each other of priority bands, LOAD INFORMATION is specified (Non Patent Literature 3). The notification through the uplink is enabled by high interference indication (HII), and the notification through the downlink is enabled by relative narrowband Tx power (RNTP).

CITATION LIST

Non Patent Literature

NPL 1: 3GPP TS 36.300 V8.9.0 (2009-06), 3GPP TSG RAN E-UTRA and E-UTRAN Overall description, pp. 86

NPL 2: 3GPP TSG RAN R1-06928, Performance evaluation of uplink interference avoidance techniques, Freescale Semiconductor NPL 3: 3GPP TS 36.423 V8.6.0 (2009-06), 3GPP TSG RAN EUTRAN X2AP, pp. 27

SUMMARY OF THE INVENTION

Problem to be Solved by the Invention

However, on a terminal determined as an edge terminal, bands other than a priority band for a local cell cannot be set as a usable band. In other words, there is a problem that the usable band for the edge terminal is excessively restricted although inter-adjacent-cell interference is suppressed, and hence expected throughput may not be able to be exhibited.

An object of this invention is to provide a communication technology that solves the above-mentioned problem.

Means to Solve the Problem

In order to realize the above-mentioned object, a base station according to this invention is a base station, which performs radio communications with a communication terminal within a main communication area, including:

a priority band setting unit that sets a main priority radio resource that can be used for the main communication area on a higher priority basis than for a communication area adjacent to the main communication area, and acquires a particular priority radio resource that can be used for at least one particular communication area adjacent to the main communication area on a higher priority basis than for a communication area adjacent to the at least one particular communication area; and a usable band setting unit that acquires a communication quality difference regarding the communication terminal between communication quality related to the main communication area and communication quality related to the at least one particular communication area, and sets the main priority radio resource and at least one particular priority radio resource as usable radio resources for the communication terminal when at least one condition that the communication quality difference is larger than a threshold value is fulfilled.

In order to realize the above-mentioned object, a communication terminal according to this invention is a communication terminal, which performs radio communications with a base station that manages a main communication area, including:

a reception state measuring unit that measures communication quality related to the main communication area and communication quality related to at least one particular communication area adjacent to the main communication area; and a terminal operation unit that communicates with the base station by using a usable radio resource obtained by adding: a main priority radio resource set to be used for the main communication area on a higher priority basis than for another communication area; and at least one particular priority radio resource set to be used for the at least one particular communication area on a higher priority basis than for another communication area, when at least one condition that the communication quality difference between the communication quality related to the main communication area and the communication quality related to the at least one particular communication area is larger than a threshold value is fulfilled.

In order to realize the above-mentioned object, a method according to this invention is a usable radio resource setting method for setting a usable radio resource to be used to perform radio communications between a base station and a communication terminal, the base station managing a main communication area adjacent to which at least one particular communication area exists, and the main communication area and the at least one particular communication area including a main priority radio resource and a particular priority radio resource, respectively, which can be used therefor on a higher priority basis than for another communication area, the usable radio resource setting method including:

acquiring a communication quality difference regarding the communication terminal between communication quality related to the main communication area and communication quality related to the at least one particular communication area; and setting the main priority radio resource to which at least one particular priority radio resource is added, as usable radio resources for the communication terminal when at least one condition that the communication quality difference is larger than a threshold value is fulfilled.

In order to realize the above-mentioned object, a program according to this invention is a control program for a base station, which performs radio communications with a communication terminal within a main communication area, the control program being configured to:

set a main priority radio resource that can be used for the main communication area on a higher priority basis than for another communication area;

acquire a particular priority radio resource that can be used for at least one particular communication area adjacent to the main communication area on a higher priority basis than for another communication area;

acquire a communication quality difference regarding the communication terminal between communication quality related to the main communication area and communication quality related to the at least one particular communication area; and set the main priority radio resource to which at least one particular priority radio resource is added, as usable radio resources for the communication terminal when at least one condition that the communication quality difference is larger than a threshold value is fulfilled.

Effect of the Invention

This invention is effective in that throughput characteristics are improved while suppressing inter-adjacent-cell interference.

BRIEF DESCRIPTION OF THE DRAWING

FIG. 7 is a diagram illustrating examples of a list of communication quality differences between a local cell and adjacent cells according to the first exemplary embodiment of this invention.

FIG. 14 is a diagram illustrating examples of a list of communication quality differences between a local cell and adjacent cells according to the fourth exemplary embodiment of this invention.

DETAILED DESCRIPTION OF EXEMPLARY EMBODIMENTS

Hereinafter, exemplary embodiments of this invention are exemplarily described in detail with reference to the accompanying drawings. However, structural components described in the following exemplary embodiments are merely examples, and the technical scope of this invention is not intended to be limited only thereto.

First Exemplary Embodiment

A first exemplary embodiment of this invention relates to a technology for setting a radio resource used by a communication terminal serving as a mobile station, in particular, relates to a method of effectively allocating radio resources while realizing avoidance of inter-adjacent-cell interference. In this embodiment, a sectorized cell structure developed by LTE is described, but this invention is not limited thereto.

(Overall Configuration of System)

Figure 1:
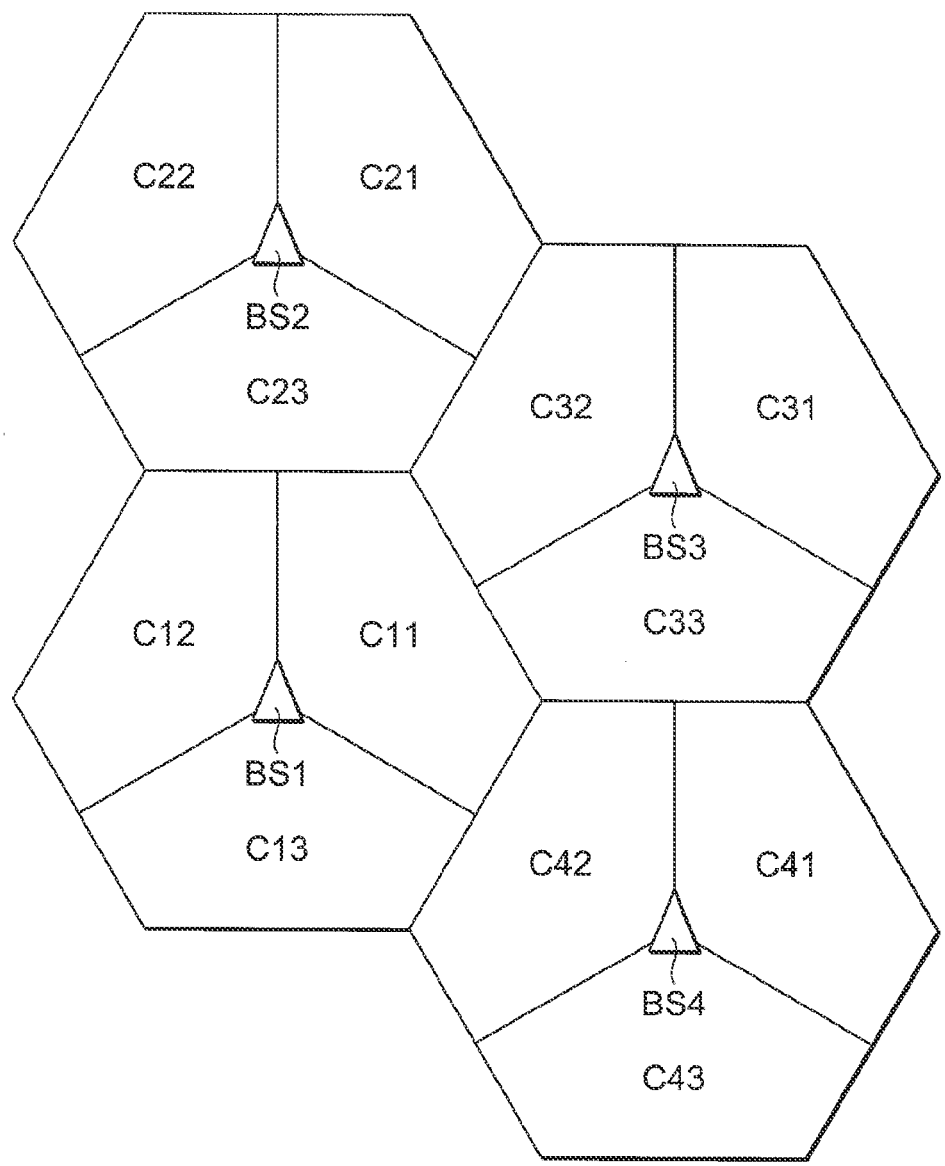
FIG. 1 is a schematic structural diagram of a communication system including a base station and a communication terminal according to a first exemplary embodiment of this invention.

FIG. 1 is a schematic structural diagram of a communication system including a base station and the communication terminal according to this embodiment. A base station BS1 manages three cells C11, C12, and C13, and the other base stations BS2 to BS4 each manage three cells in the same manner. Thus, the base station according to this embodiment uses a plurality of antennas each having a directivity to thereby divide one cell with the base station as its center into a plurality of areas corresponding to the respective antennas. The divided areas are referred to as "sectorized cell" (hereinafter, the word "cell" has a concept including "sectorized cell"). In this embodiment, the description is given by taking a three-sectorized cell structure as an example of communication areas managed by the base station, but this invention is not limited thereto, for example, the number of sectorized cells may be another value such as a six-sectorized cell structure. Further, this invention can be applied to an omni cell structure.

Figure 2:
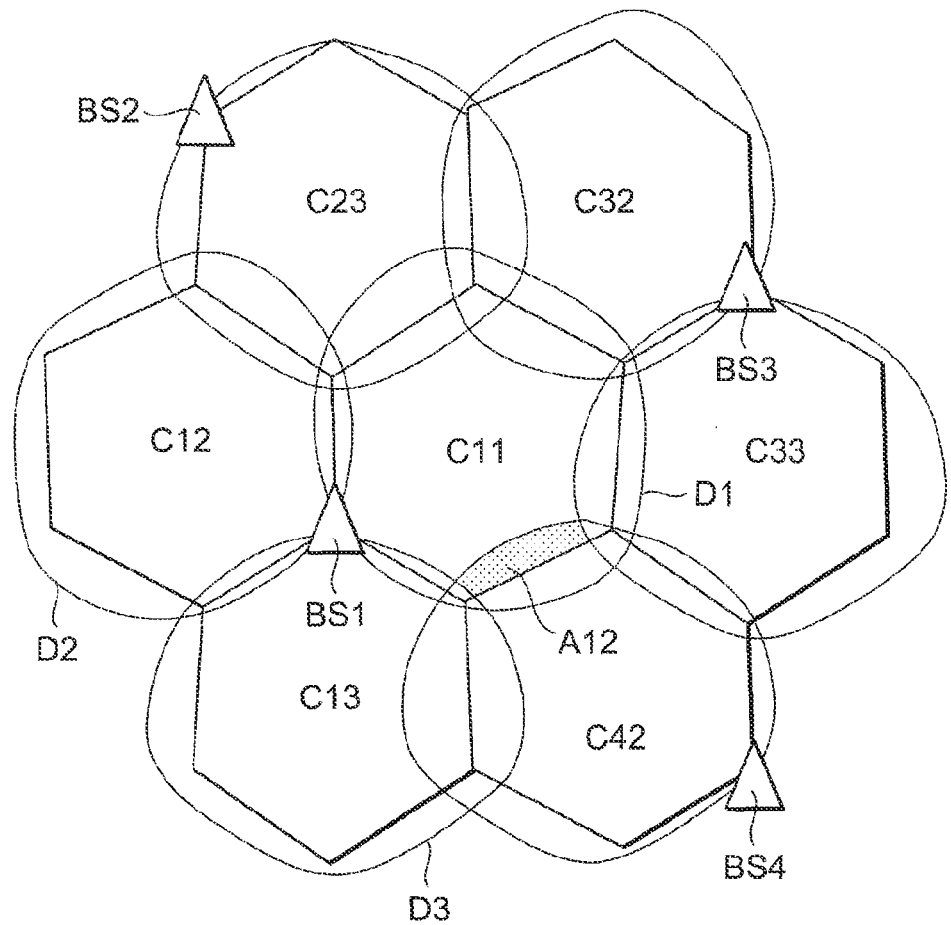
FIG. 2 is a diagram illustrating an example of shapes of cells according to the first exemplary embodiment of this invention.

FIG. 2 illustrates shapes of adjacent cells C12, C13, C23, C32, C33, and C42 with the cell C11 of FIG. 1 as the center. The ellipses each indicate an effective range reached by a radio wave. For example, ellipses DI to D3 respectively indicate the effective ranges reached by the radio waves by the directivities of the three antennas (not shown) provided within the base station BS1. The actual range reached by the radio wave has a complicated shape depending on topography, buildings, and the like, but is represented by an ellipse here in order to simplify the description. An area indicated by a hexagon having sides within ranges in which the ellipses overlap with one another is defined as the cell. In other words, the base station BS1 manages the cells C11, C12, and C13.

(Description of Prerequisite Technology)

Figure 3:
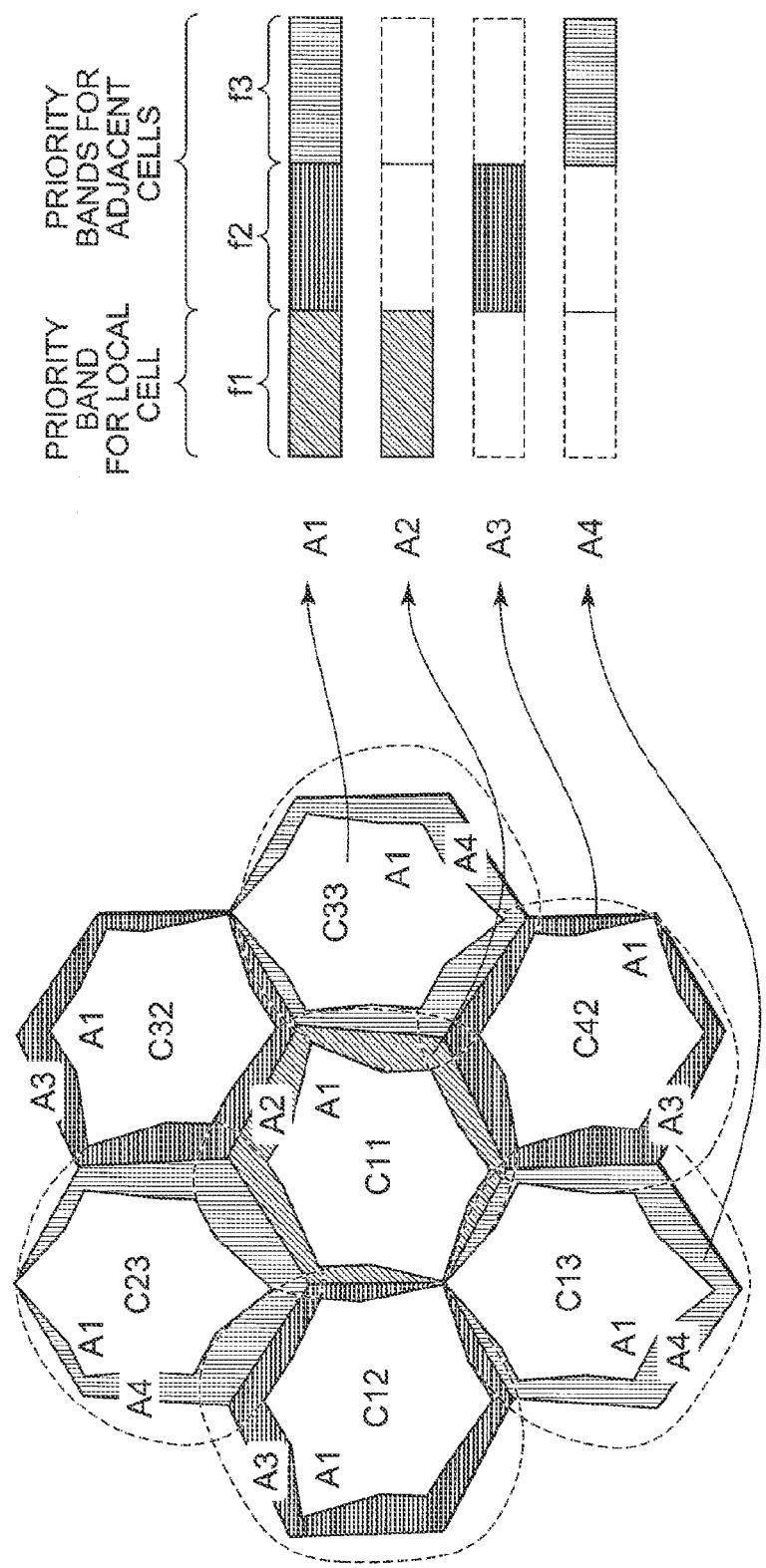
FIG. 3 is a diagram illustrating a prerequisite technology for the first exemplary embodiment of this invention.

As is clear from FIG. 2, in each of the cells, little interference of the radio waves from the other antennas is received around the center of the cell in which little ellipses (range is reached by the radio waves) overlap with one another, but a large amount of such interference is received around a cell boundary. Therefore, in a prerequisite technology for this embodiment, as illustrated in FIG. 3, consideration is given by dividing the cells into a cell center area A1 indicated by being outlined and hatched cell boundary areas A2 to A4, each of which is handled in a different manner in terms of the allocation of the radio resource. For example, with the cell C11 focused on, the cell is divided into two, in other words, the outlined cell center area A1 and the hatched cell boundary area A2 shaded by lines. For example, with regard to the frequency band serving as a kind of radio resource, different frequency bands are used in the boundary areas adjacent to each other in order to avoid interference.

That is, in FIG. 3, bands f1, f2, and f3 that do not overlap one another are allocated to the boundary areas A2, A3, and A4, respectively, of the respective cells as shown in the table on the right side. The bands f1, f2, and f3 are obtained by dividing a usable band into three and allocating the three to the respective cells for priority use, and are each referred to as "priority band" (a kind of priority radio resource) for each cell. In other words, f1 represents the priority band for the cell C11, f2 represents the priority band for the cells C12, C32, and C42, and f3 represents the priority band for the cells C13, C23, and C33. Meanwhile, the overall band f1+f2+f3 is allocated to the center area A1. In other words, a communication terminal (hereinafter, referred to also as "center terminal") existing within the center area A1 of each cell uses the overall band to perform communications with the base station. Then, a communication terminal (hereinafter, referred to also as "edge terminal") existing within the boundary area A2, A3, or A4 uses only the priority band f1, f2, or f3, respectively, and the usable bands are set so as not to overlap one another among the adjacent cells, to thereby suppress the inter-adjacent-cell interference. Note that, in this embodiment, the same priority bands are allocated in groups of three cells (here, cells C12, C32, and C42 and cells C13, C23, and C33), but this invention is not limited thereto. For example, different priority bands may be allocated to all the adjacent cells, or three groups of two cells (for example, C42 and C23) may be formed and three priority bands may be respectively allocated thereto.

Meanwhile, consideration is given to the communication terminal located in, for example, an area A12 of FIG. 2. The area A12 is close to the cell boundary with respect to the cell C42, and hence a priority band f2 for the cell C42 cannot be used, but a level of interference to be imposed on the cells C13 and C33 is low even if the priority band f3 for the cells C13 and C33 is used for the transmission. In other words, interference to be imposed on the other cells does not become a problem even if the communication terminal located in the area A12 performs transmission by using the band f3. Focusing on this point, this embodiment proposes a system which can widen the band that can be selected by the edge terminal while maintaining suppression of the inter-adjacent-cell interference in consideration of further breaking down the boundary area.

(System Configuration)

Figure 4:
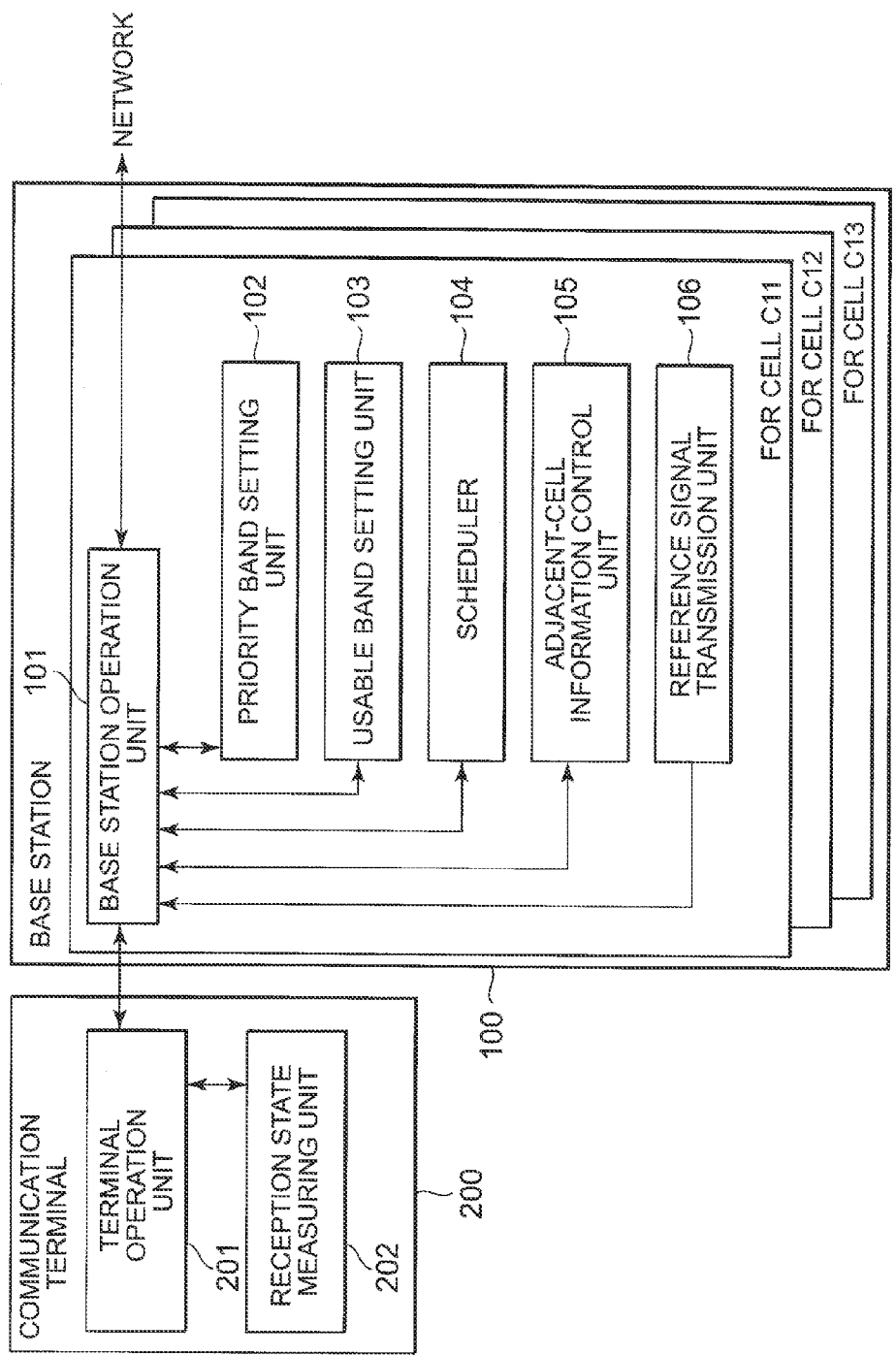
FIG. 4 is a block diagram illustrating an internal configuration of the base station and the communication terminal according to the first exemplary embodiment of this invention.

FIG. 4 is a block diagram illustrating an example of a configuration of a radio communication system according to the first exemplary embodiment of this invention. Referring to FIG. 4, this radio communication system includes a base station 100 and a communication terminal 200. The base station 100 is connected to a network (not shown). Further, although not shown, the base station 100 can also be connected to a plurality of communication terminals. Further, there also exist a plurality of base stations, and the base stations are connected to one another through the network.

The base station 100 includes a base station operation unit 101, a priority band setting unit 102, a usable band setting unit 103, a scheduler 104, an adjacent-cell information control unit 105, and a reference signal transmission unit 106. The base station operation unit 101 has a function equivalent to that of a base station which is generally used in the radio communication system, a configuration and an operation of which are well-known, and hence description thereof is omitted. The base station operation unit 101, the priority band setting unit 102, the usable band setting unit 103, the scheduler 104, the adjacent-cell information control unit 105, and the reference signal transmission unit 106 are provided for each of the cells (in the example of FIG. 4, for each of cell C11, cell C12, and cell C13).

The priority band setting unit 102 has a function of setting the priority band for a local cell and a function of retaining priority band information on the adjacent cells. In other words, the priority band setting unit 102 sets the priority band serving as a main priority radio resource (first priority radio resource) that can be used for the local cell serving as a main communication area (first communication area) managed by the base station 100 on a higher priority basis than for the communication area adjacent to the first communication area. Then, the priority band setting unit 102 further acquires and retains the priority band information serving as a second priority radio resource that can be used for the adjacent cell serving as a particular communication area (second communication area) adjacent to the first communication area on a higher priority basis than for the communication area adjacent to the above-mentioned adjacent cell.

The usable band setting unit 103 has a function of setting the usable band for the communication terminal 200. The usable band setting unit 103 acquires a communication quality difference regarding the communication terminal 200 between a first communication quality related to the local cell serving as the first communication area and a second communication quality related to the adjacent cell serving as the second communication area. Then, when at least one condition that the communication quality difference is larger than a threshold value is fulfilled, the usable band setting unit 103 sets a usable radio resource (here, usable band) of the communication terminal 200 by adding a particular priority radio resource (second priority radio resource) to the first priority radio resource. Details of a processing performed by the usable band setting unit 103 are described later with reference to FIG. 6.

The scheduler 104 has a function of allocating the radio resource to the communication terminal from within the usable band set by the usable band setting unit 103. The adjacent-cell information control unit 105 has a function of notifying the base station operation unit 101 of adjacent-cell information including an adjacent-cell number. In a case where the cell C11 of FIG. 2 is set as the local cell, the adjacent-cell information control unit 105 notifies the communication terminal 200 within the local cell of cell numbers C12, C13, C23, C32, C33, and C42 as the adjacent-cell information. The reference signal transmission unit 106 has a function of transmitting a reference signal serving as a basis of a reception state to the base station operation unit 101 at predetermined timings. The adjacent-cell information and the reference signal are transmitted to the communication terminal by the base station operation unit 101.

Meanwhile, the communication terminal 200 includes a terminal operation unit 201 and a reception state measuring unit 202. The terminal operation unit 201 has a function equivalent to that of a communication terminal which is generally used in the radio communication system, and hence detailed description of a configuration and an operation thereof are omitted. The reception state measuring unit 202 has a function of measuring the reception state of the communication terminal and providing a report thereof to the terminal operation unit 201. The reception state measured by the reception state measuring unit 202 is transmitted to the base station by the terminal operation unit 201. Based on a notification sent from the adjacent-cell information control unit 105, the reception state measuring unit 202 measures, for example, reception power (reference signal received power (RSRP)) of the respective reference signals for the local cell and the adjacent cells, and reports the results as communication quality for the respective cells to the base station in the local cell via the terminal operation unit 201.

Figure 5:
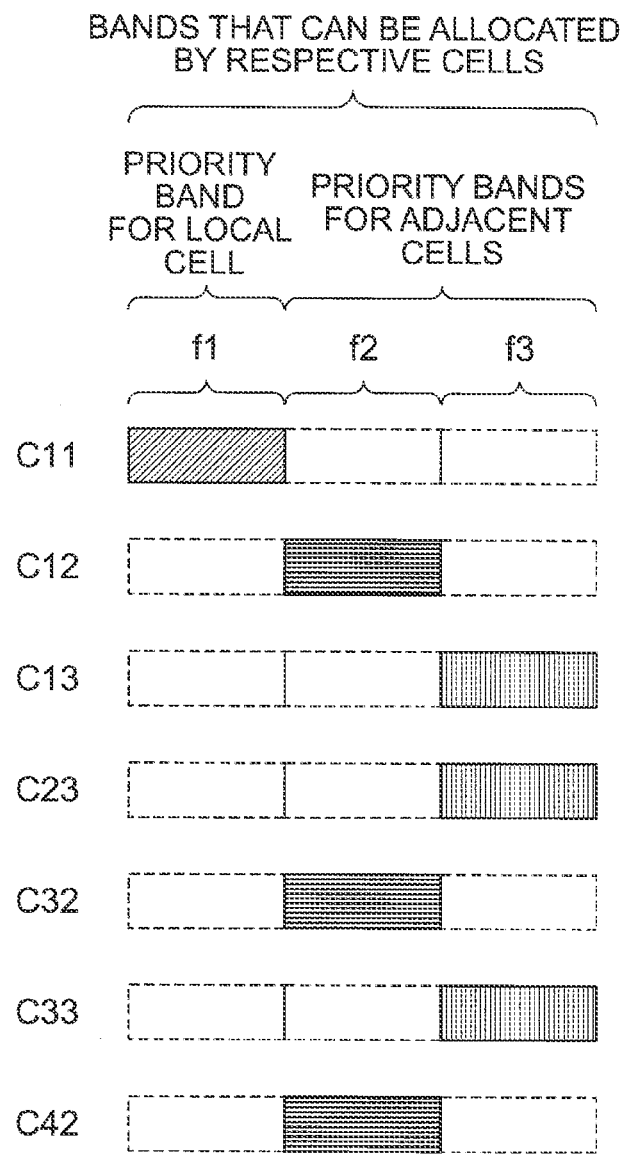
FIG. 5 is a diagram illustrating an example of bands that can be allocated to the respective cells and priority bands according to the first exemplary embodiment of this invention.

Next, the allocation of the frequency band is described by taking an example in which the cell C11 of FIG. 2 is set as the local cell. FIG. 5 illustrates the bands that can be allocated to the respective cells and the priority bands. It is assumed that the priority bands for the respective cells are set in advance. The priority band setting unit 102 sets the priority band for the cell C11 as f1, and retains the priority band information on the adjacent cells by setting the priority band for the cells C12, C32, and C42 as f2 and the priority band for the cells C13, C23, and C33 as f3. In other words, from the viewpoint of C11 as the center, as illustrated in the upper part of FIG. 5, the bands that can be allocated can be considered as being divided into the priority band f1 for the local cell and the priority bands f2 and f3 for the adjacent cells.

(Description of Operation)

Next, an operation of this embodiment is described with reference to the accompanying drawings. Here, the description is given in relation to the case where the cell C11 of FIG. 2 is set as the local cell. Further, as illustrated in FIG. 5, an overall band f_all that can be allocated to the cell C11 is f1+f2+f3.

Figure 6:
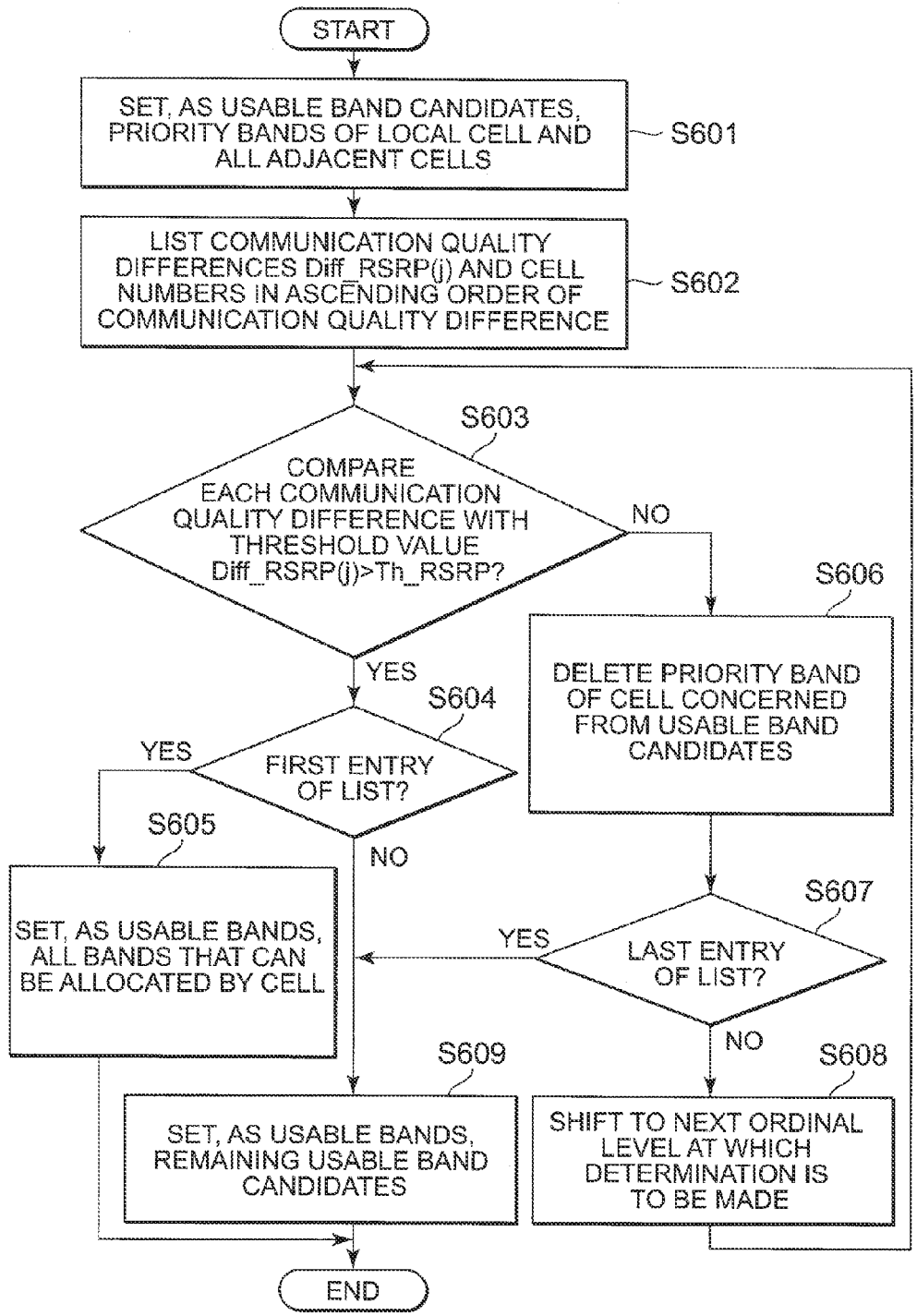
FIG. 6 is a flowchart illustrating a processing performed by the base station according to the first exemplary embodiment of this invention.

FIG. 6 illustrates an operation procedure for causing the usable band setting unit 103 of the base station 100 to set the usable band for the communication terminal 200 when the communication quality is reported from the communication terminal 200. The usable band setting unit 103 sets a sum of the priority bands for the local cell and all the adjacent cells as usable band candidates f_cand(u) for a communication terminal u (S601). As illustrated in FIG. 5, the priority band for the adjacent cell with respect to the cell C11 is any one of f2 and f3, and hence the usable band candidate becomes f_cand(u)=f1+f2+f3. Subsequently, in order to determine the communication quality difference of the communication terminal u between the local cell and the adjacent cell, the following Expression 1 is used to calculate a communication quality difference Diff_RSRP(j) [dB] between the local cell and the adjacent cell, and a list thereof is created in ascending order of the communication quality difference (S602).

Diff_RSRP(j)=RSRP_Serv−RSRP_around(j)  (Expression 1)

In Expression 1, RSRP_Serv[dB] represents RSRP of the communication terminal u related to the local cell, and RSRP_around(j) [dB] represents RSRP related to an adjacent cell j (reception power of the reference signal received from the antenna of the adjacent cell j).

FIG. 7 illustrates examples of the thus-obtained communication quality difference of the communication terminal u between the local cell and the adjacent cell. Specifically, this example shows lists of differences between the communication quality related to the cell C11 and the communication quality related to the adjacent cells 12, C13, C23, C32, C33, and C42 in cases where the communication terminal u existing within the cell C11 is the center terminal and is the edge terminal. A list 701 on the left shows an example of the communication quality differences with respect to the respective adjacent cells in the case where the communication terminal u exists around the center of the cell C11 (in other words, is the center terminal). Meanwhile, a list 702 on the right shows an example of the communication quality differences with respect to the respective adjacent cells in the case where the communication terminal u exists around the adjacent area with respect to the cell C42 within the cell C11 (in other words, is the edge terminal). In those tables, reception quality differences between the local cell and the adjacent cells are listed from the top in ascending order thereof, and hence the cell number exhibiting the smaller communication quality difference, in other words, exhibiting the higher level of interference (having the smaller number No.) is arranged in the higher place.

Subsequently, in listed order, it is determined whether or not Diff_RSRP(j) is larger than a threshold value Th_RSRP [dB] (S603). When Diff_RSRP(j) is larger than Th_RSRP (S603, Yes), it is further determined whether or not the number of the list is the head, that is, the number of the list is No. 1 (S604). When the number of the list is the head (S604, Yes), the communication terminal is the center terminal subjected to a weak influence of adjacent-cell interference, and hence the overall band f_all that can be allocated by the cell is set as a usable band f_usable(u) (S605). In the case of this embodiment, the usable band becomes f_usable(u)=f_all=f1+f2+f3.

When Diff_RSRP(j) is equal to or smaller than Th_RSRP (S603, No), the priority band for the cell is deleted from f_cand(u) (S606). However, the priority band for the local cell is not deleted. In other words, in Step S606, the priority band for the adjacent cell whose level of interference to be imposed is determined to be large is deleted from the usable band. Subsequently, it is determined whether or not a list number of the adjacent cell for which the communication quality difference has been determined is the last of the list (S607). When not the last (S607, No), the procedure moves on to the next list number (S608) to continue the processing of Step S603 and the subsequent steps. For example, after the list number No. 1 is subjected to determination, No. 2 is subjected to determination. Meanwhile, when not the head of the list (S604, No), or when the determination is finished to the last of the list (S607, Yes), the communication terminal is the edge terminal subjected to a strong influence of the adjacent-cell interference, and hence the updated f_cand(u) is set as f_usable(u) (S609).

The list 702 and a list 703 of FIG. 7 are examples of the edge terminal. In the case of the list 702, only the cell C42 of No. 1 in the list is subjected to a strong influence of the adjacent-cell interference and has a communication quality difference Diff_RSRP (here, 1.5 [dB]) with respect to the local cell smaller than the threshold value (for example, 5 [dB]). Therefore, f_cand(u)=(f1+f2+f3)−f2=f1+f3, which is obtained by deleting the priority band f2 for the cell C42 (see FIG. 5), becomes the usable band for the edge terminal.

Meanwhile, in the case of the list 703, the cell C33 and the cell C42 of No. 1 and No. 2 in the list are subjected to a strong influence of the adjacent-cell interference and have small communication quality differences Diff_RSRP with respect to the local cell. Therefore, f_cand(u)=(f1+f2+f3)f2−f3=f1, which is obtained by deleting the priority band f3 for the cell C33 and the priority band f2 for the cell C42 (for both thereof, see FIG. 5), becomes the usable band for the edge terminal.

Figure 8:
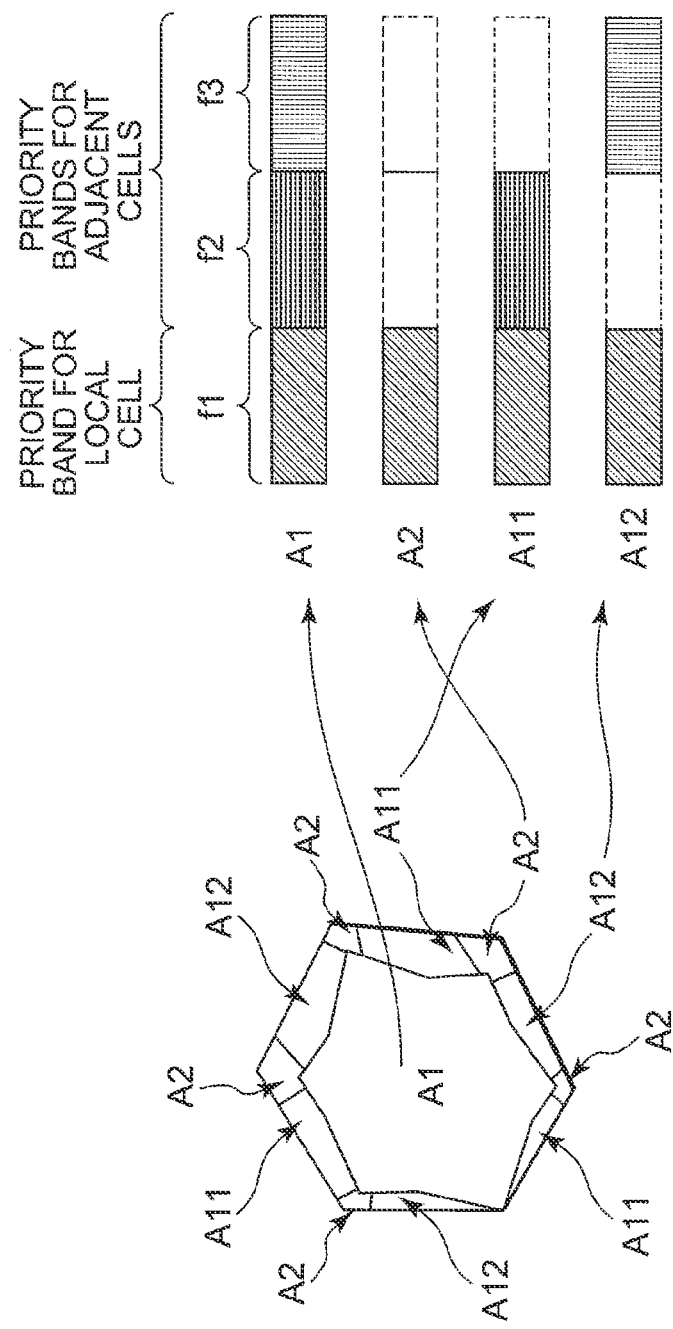
FIG. 8 is a diagram illustrating an example of usable bands set by the processing according to the first exemplary embodiment of this invention.

FIG. 8 illustrates an example of the usable band for the cell C11 set in the processing illustrated in the flowchart of FIG. 6. As illustrated in FIG. 8, a whole band of f1+f2+f3 is set as the usable band for the center terminal within the center area A1, and only the priority band f1 is set as the usable band for the edge terminal within the adjacent area A2 in which there exists interference with two adjacent cells. Meanwhile, the band other than the priority band for the local cell can also be set as the usable band for the edge terminal existing in adjacent areas A11 and A12 which cause a problem of only one adjacent cell. Specifically, three adjacent areas A11 exist within the cell, and a band of f1+f2 can be set as the usable band for the respective adjacent areas A11. Meanwhile, three adjacent area A12 exist within the cell as well, and a band of f1+f3 can be set as the usable band for the respective adjacent areas A12.

(Effects of the First Exemplary Embodiment)

As described above, the selection flexibility for the radio resource improves even for the communication terminal located in the adjacent area within the cell in the case where, for example, the area is located in the area A11 or A12 of FIG. 8, and hence it is possible to improve throughput for such a communication terminal.

This, in other words, is because the radio resources that can be used by the respective communication terminals are determined more strictly in consideration of the adjacent cell exhibiting the second strongest interference based on the communication quality difference between the local cell and the adjacent cell, which improves the band selection flexibility of the communication terminal subjected to a strong influence of the adjacent-cell interference. Through setting of the usable radio resource for the communication terminal based on the communication quality difference between the local cell and the adjacent cell, it is possible to widely set the usable radio resource for the communication terminal while maintaining the suppression of the inter-adjacent-cell interference.

As a result, the selection flexibility for the radio resource improves for the communication terminal subjected to a strong influence of the adjacent-cell interference, and hence throughput characteristics of the communication terminal improve. Further, the radio resource use efficiency of the communication terminal improves, and hence throughput characteristics of the entire system improve as well. That is, it is possible to provide a setting method for the usable radio resource which, while suppressing the inter-adjacent-cell interference, improves the selection flexibility for the band to be allocated to the communication terminal subjected to a strong influence of the adjacent-cell interference and improves throughput characteristics.

Note that, in this embodiment, as a condition for deleting or adding the priority band, the communication quality is determined by using RSRP, but this invention is not limited thereto. For example, a ratio of overall reception power to the reception power of the reference signal (reference signal received quality (RSRQ)) may be used to determine the communication quality. In addition, a ratio of noise power and interfering power to the reception power of the reference signal (signal to interference plus noise ratio (SINR)) may be used to determine the communication quality. Further, a path loss calculated from a difference between reception power and transmission power of the reference signal may be used to determine the communication quality. Here, a signal for measuring the reception power is not limited to the reference signal, and may be a pilot signal or a notification signal.

Further, in this embodiment, the threshold value Th_RSRP is set to a fixed value, but this invention is not limited thereto, and the threshold value may be updated depending on a communication load on the base station. For example, it is conceivable that the threshold value is updated depending on a ratio between the number of communication terminals subjected to a strong influence of the adjacent-cell interference and the number of communication terminals subjected to a weak influence thereof. Further, the threshold value may be updated depending on a resource activity ratio, or in the case of an uplink, interference over thermal (IoT) that varies depending on a strength of the adjacent-cell interference may be used to update the threshold value. In addition, in the case of a downlink, channel quality information (CQI) that varies depending on the strength of the adjacent-cell interference or the like may be used to update the threshold value.

Further, in this embodiment, it is assumed that the priority band information on the adjacent cell is set in advance, but this invention is not limited thereto, and the base stations may notify one another of the priority band information.

Second Exemplary Embodiment

Figure 9:
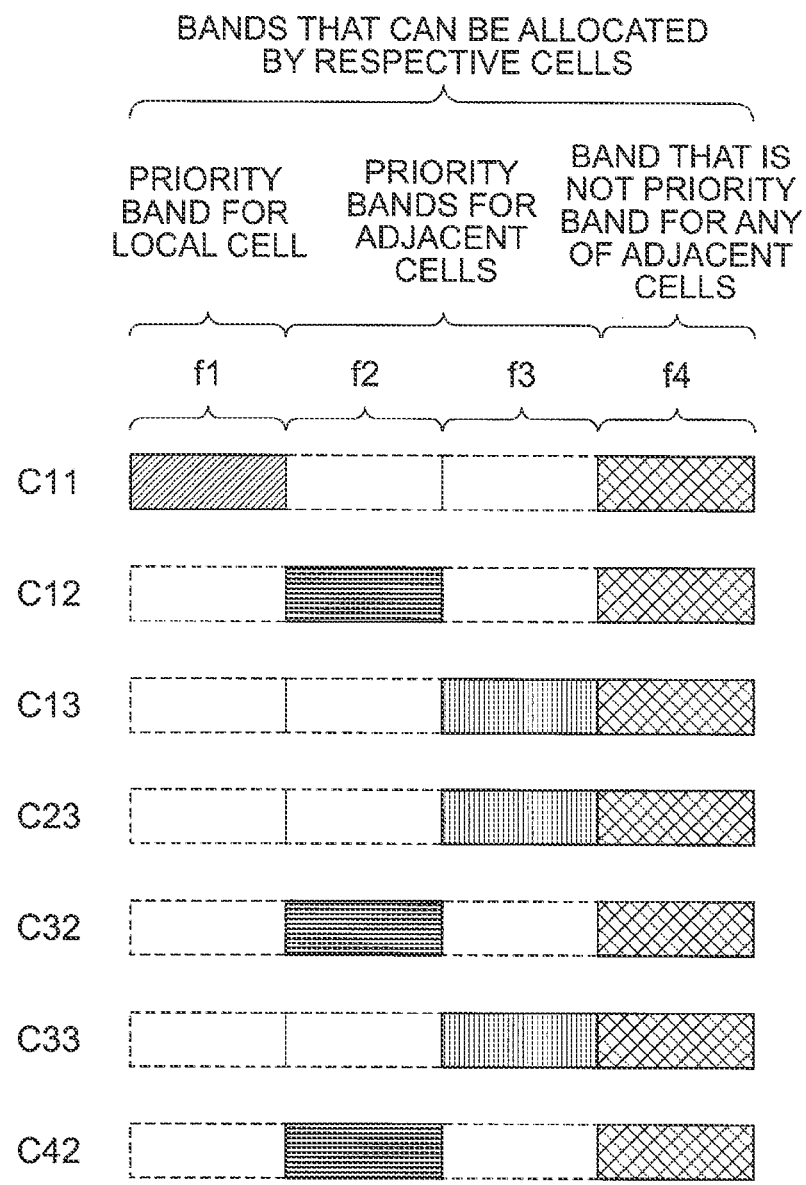
FIG. 9 is a diagram illustrating an example of bands that can be allocated to respective cells and priority bands according to a second exemplary embodiment of this invention.

A second exemplary embodiment of this invention is described. In this embodiment, as a band that can be allocated to the respective cells, as illustrated in FIG. 9, a band f4 that is not the priority band for any of the adjacent cells including the local cell is set. This embodiment is the same as the first exemplary embodiment except for this point, and hence detailed description of a configuration and an operation thereof are omitted here.

In the case of this embodiment, the overall band f_all that can be allocated is f1+f2+f3+f4, and hence the usable band for the center terminal becomes f_usable(u)=f_all=f1+f2+f3+f4.

Figure 10:
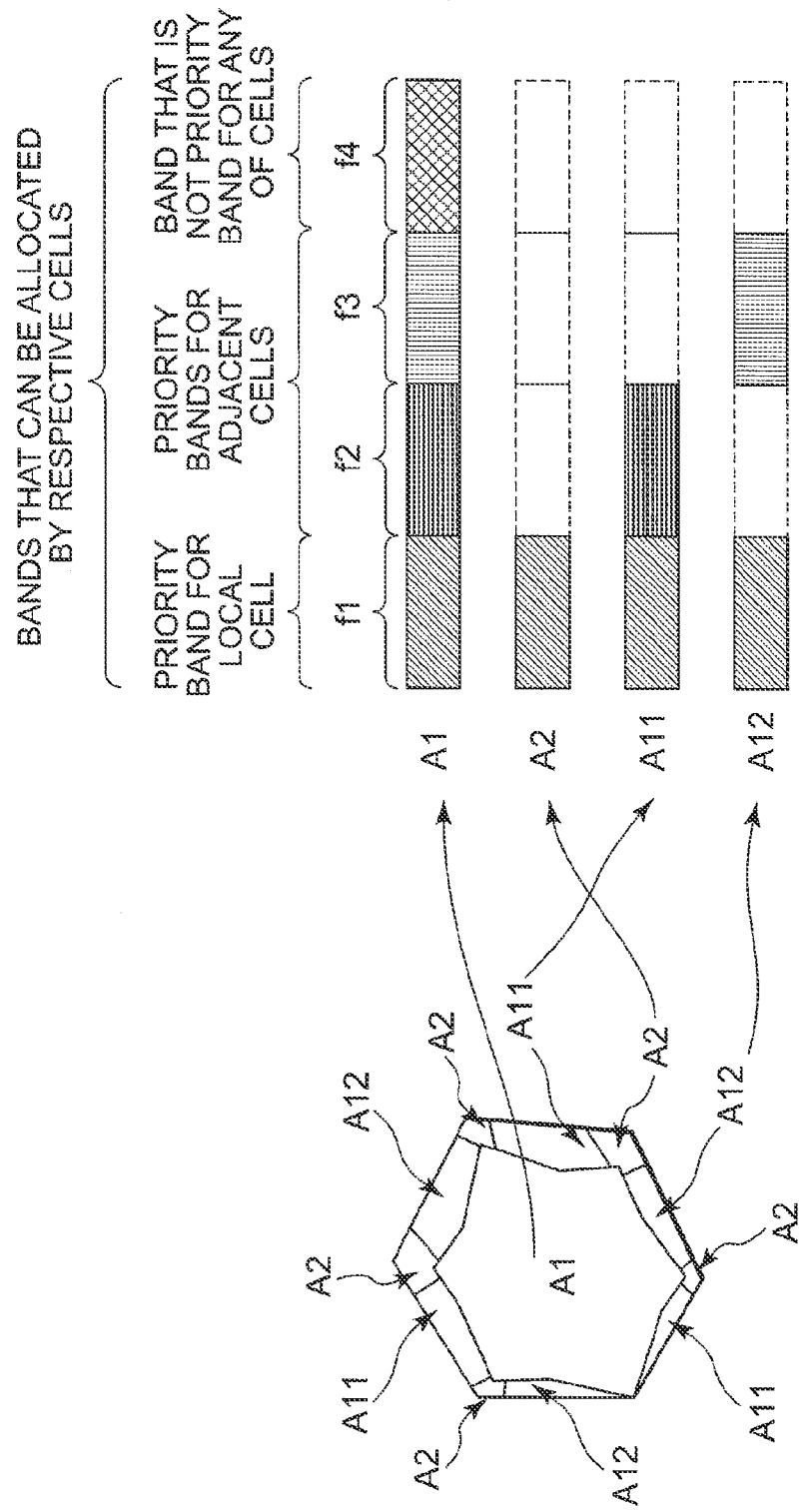
FIG. 10 is a diagram illustrating an example of usable bands set by a processing according to the second exemplary embodiment of this invention.

Meanwhile, in this embodiment, according to the processing illustrated in the flowchart of FIG. 6, in the case of the edge terminal having Diff_RSRP(j) as shown in the list 702 of FIG. 7, the usable band becomes f_usable(u)=(f1+f2+f3)−f2=f1+f3 in the same manner as in the first exemplary embodiment. This is because the priority bands for the local cell and all the adjacent cells are set as candidates in Step S601, and the bands that cannot be used are deleted in Step S606. As a result thereof, as illustrated in FIG. 10, a whole band of f1+f2+f3+f4 is set as the usable band for the center terminal within the center area A1, and only the priority band f1 is set as the usable band for the edge terminal within the adjacent area A2 in which there exists interference with two adjacent cells. Meanwhile, the band f2 or f3 other than the priority band for the local cell can also be set as the usable band for the edge terminal existing in the adjacent areas A11 and A12 which cause a problem of only one adjacent cell. Specifically, three adjacent areas A11 exist within the cell, and a band of f1+f2 can be set as the usable band for the respective adjacent areas A11. Meanwhile, three adjacent area A12 exist within the cell as well, and a band of f1+f3 can be set as the usable band for the respective adjacent areas A12.

(Effects of the Second Exemplary Embodiment)

Even in this embodiment, as in the first exemplary embodiment, the selection flexibility for the radio resource improves, and hence throughput characteristics of the communication terminal improve. Further, the radio resource use efficiency of the communication terminal improves, and hence throughput characteristics of the entire system improve as well. That is, it is possible to provide a setting method for the usable radio resource which, while suppressing the inter-adjacent-cell interference, improves the selection flexibility for the band to be allocated to the communication terminal subjected to a strong influence of the adjacent-cell interference and improves throughput characteristics.

Third Exemplary Embodiment

Next, a third exemplary embodiment of this invention is described in detail with reference to the accompanying drawings. A radio communication system according to this embodiment has substantially the same configuration and operation as those of the radio communication system according to the first exemplary embodiment illustrated in FIG. 3, and hence the same components are described by using the same reference symbols, detailed description of which is omitted.

Next, the operation of this embodiment is described with reference to the accompanying drawings. In the same manner as in the first exemplary embodiment, the description is given here in relation to the case where the cell C11 of FIG. 2 is set as the local cell. Further, in the same manner as in the second exemplary embodiment, the overall band f_all that can be allocated to the cell C11 is set as f1+f2+f3+f4. The third exemplary embodiment is different from the first exemplary embodiment in that the usable band setting unit 103 carries out an operation illustrated in FIG. 11 instead of FIG. 6.

Figure 11:
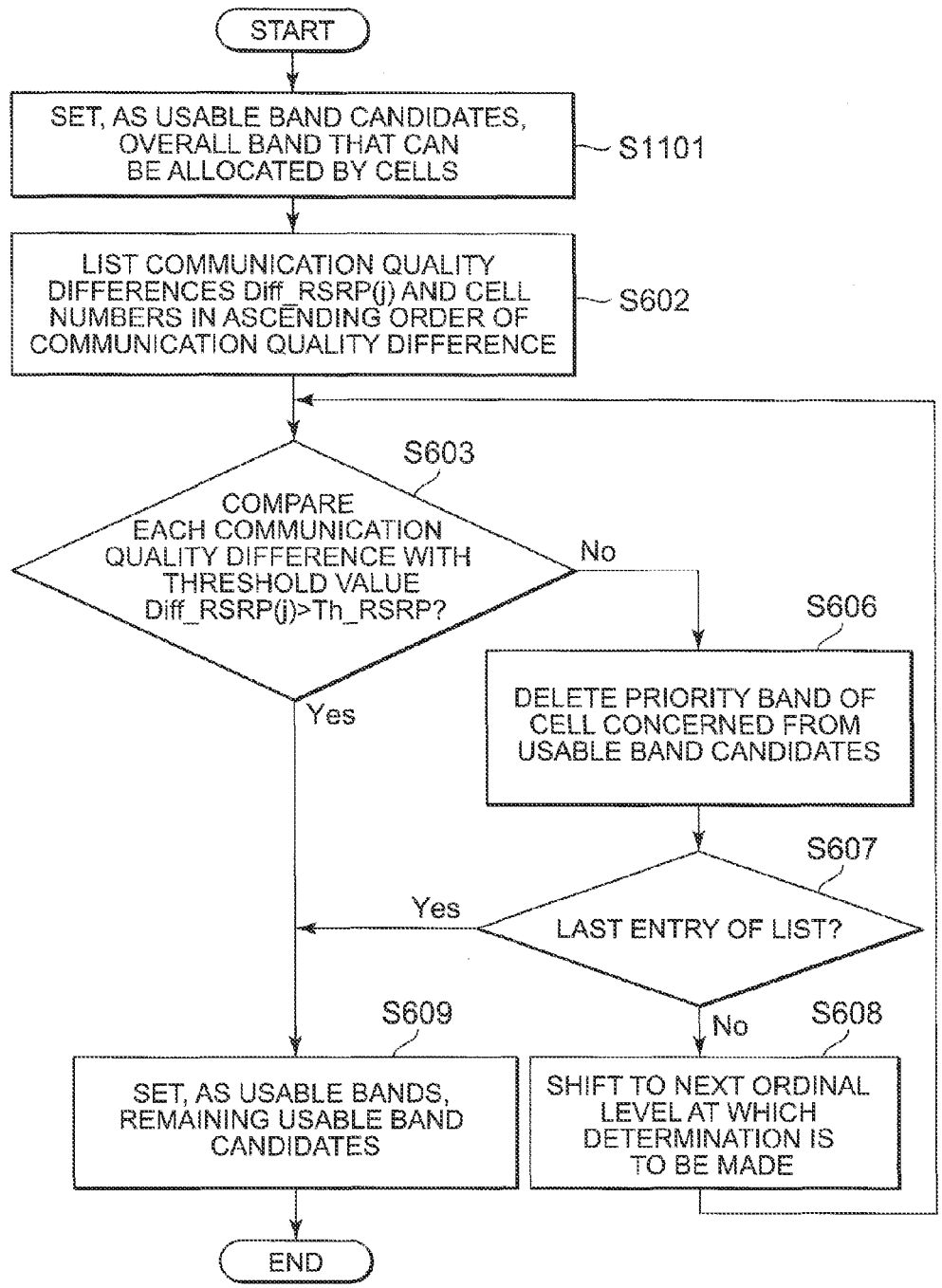
FIG. 11 is a flowchart illustrating a processing performed by the base station according to a third exemplary embodiment of this invention.

Referring to FIG. 11, Step S601 of FIG. 6 is replaced by Step S1101, and Step S604 and Step S605 are deleted.

In Step S1101, the usable band setting unit 103 sets the overall band f_all that can be allocated by the cells as the usable band candidates f_cand(u) for the communication terminal u. Subsequently, in the same manner as in FIG. 6, in order to determine the communication quality difference of the communication terminal u between the local cell and the adjacent cell, Expression 1 is used to calculate the communication quality difference Diff_RSRP(j) between the local cell and the adjacent cell, and a list thereof is created in ascending order of the communication quality difference (S602).

Subsequently, in the listed order, it is determined whether or not Diff_RSRP(j) is larger than the threshold value Th_RSRP [dB] (S603). When Diff_RSRP(j) is equal to or smaller than Th_RSRP (S603, No), the priority band for the cell is deleted from f_cand(u) (S606). However, the priority band for the local cell is not deleted. Subsequently, it is determined whether or not a list number of the adjacent cell for which the communication quality difference has been determined is the last of the list (S607). When not the last (S607, No), the procedure moves on to the next list number (S608) to continue the processing of Step S603 and the subsequent steps.

When the list number is the last of the list in Step S607 (S607, Yes), or when Diff_RSRP(j) is larger than Th_RSRP in Step S603 (S603, Yes), the updated f_cand(u) is set as f_usable(u) (S609).

Figure 12:
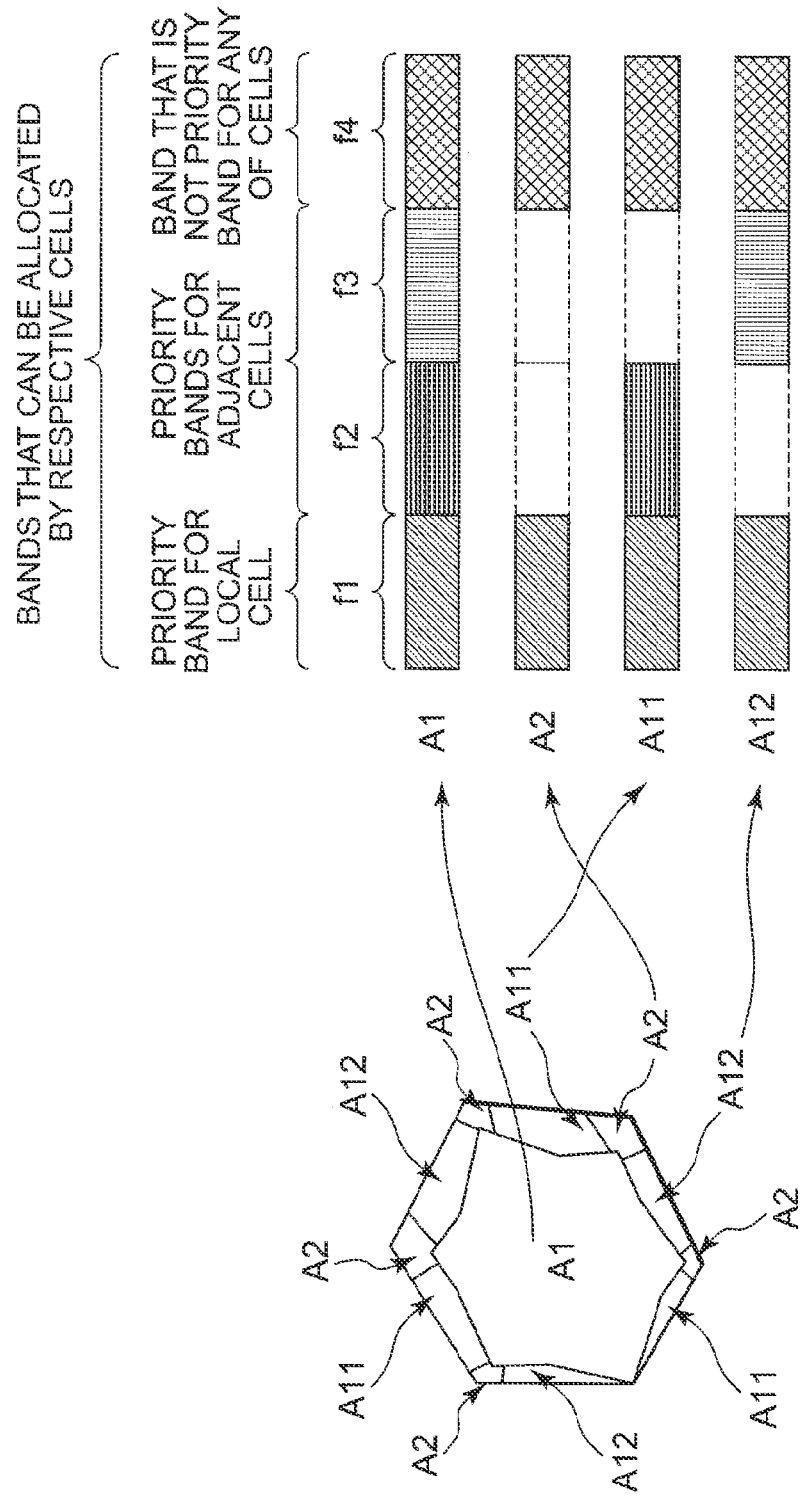
FIG. 12 is a diagram illustrating an example of usable bands set by the processing according to the third exemplary embodiment of this invention.

As illustrated in FIG. 9 of the second exemplary embodiment, in the case where the band f4 that is neither the priority band for any one of the adjacent cells nor the priority band for the local cell is set, performing the processing of FIG. 11 produces a result that available bands for the edge terminal become different from the case of performing the processing of FIG. 6. This result is illustrated in FIG. 12. The overall band f_all that can be allocated is f1+f2+f3+f4, and hence in the same manner as in the second exemplary embodiment, the usable band becomes f_usable(u)=f_all=f1+f2+f3+f4 for the center terminal existing in the center area A1 of the local cell. Meanwhile, the usable band for the edge terminal (existing in the area A12) within the list 702 of FIG. 7 becomes f_usable(u)=f_all−f2=(f1+f2+f3+f4)−f2=f1+f3+f4. In the same manner, the usable band for the terminal existing in the area A11 becomes f_usable(u)=f_all−f3=(f1+f2+f3+f4)−f3=f1+f2+f4. Then, the usable band for the terminal existing in the area A2 becomes f_usable(u)=f_all−f2−f3=(f1+f2+f3+f4)−f2−f3=f1+f4.

(Effects of the Third Exemplary Embodiment)

In the case of this embodiment, the band that does not belong to the priority band for any of the cells is also set as the usable band for the terminal exhibiting a strong influence of the adjacent-cell interference, which produces the processing result different from that of the second exemplary embodiment. According to this embodiment, in the case where f4 is allocated for the communication terminal subjected to a strong influence of the adjacent-cell interference, the selection flexibility for the radio resource further improves than in the first exemplary embodiment and the second exemplary embodiment.

Fourth Exemplary Embodiment

Next, a fourth exemplary embodiment of this invention is described in detail with reference to the accompanying drawings. A radio communication system according to this embodiment has substantially the same configuration as that of the radio communication system according to the first exemplary embodiment illustrated in FIG. 3, and hence the same components are described by using the same reference symbols, detailed description of which is omitted.

Figure 13:
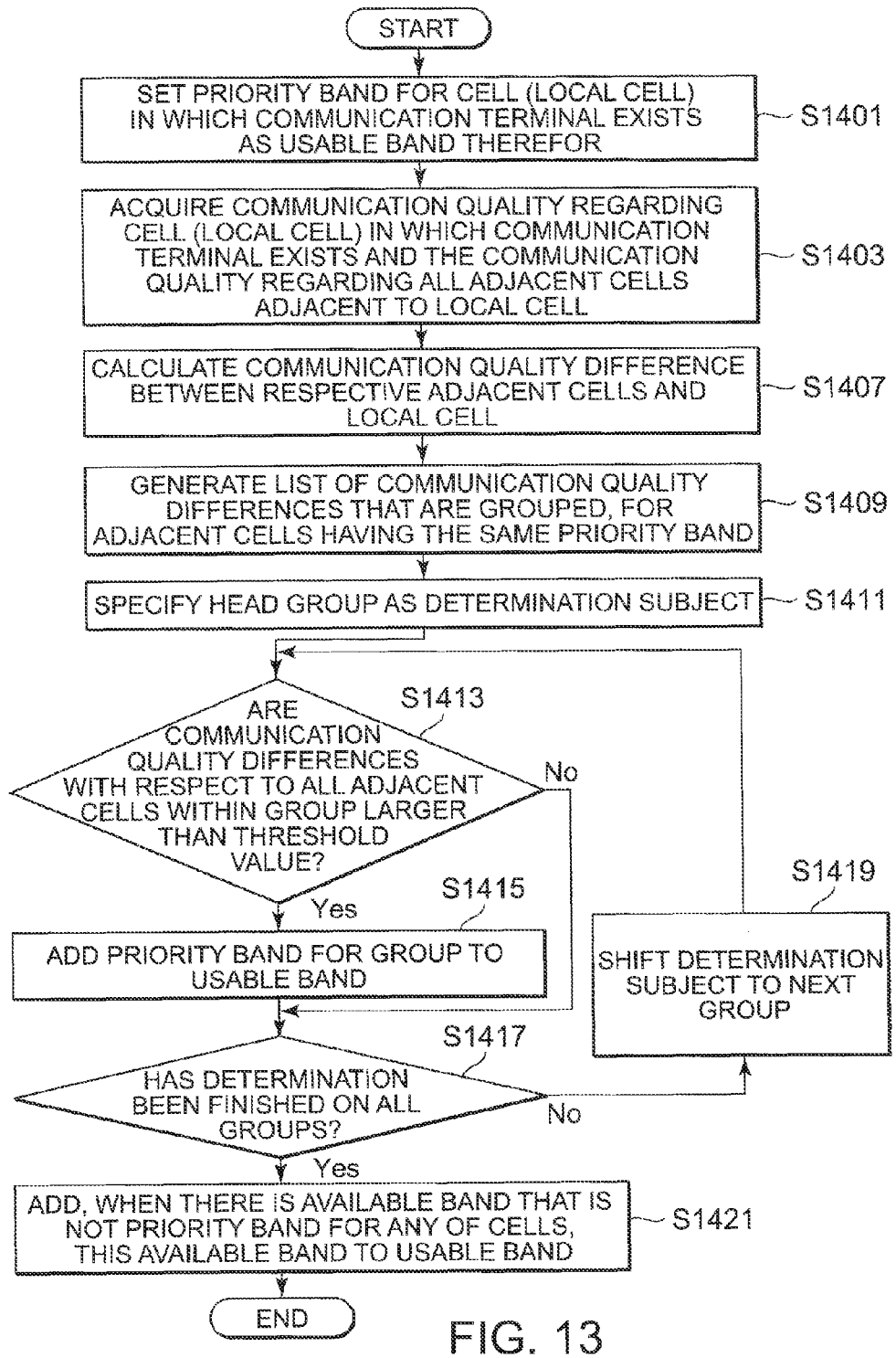
FIG. 13 is a flowchart illustrating a processing performed by the base station according to a fourth exemplary embodiment of this invention.

FIG. 13 is a flowchart illustrating a setting method for the usable band according to this embodiment. First, in Step S1401, the priority band f1 for a cell (local cell) in which a communication terminal exists is set as the usable band for the communication terminal. This processing is performed by the usable band setting unit 103. Subsequently, in Step S1403, the reception state measuring unit 202 of the communication terminal 200 measures the communication quality regarding the local cell and the communication quality regarding all the adjacent cells adjacent to the local cell, and the usable band setting unit 103 of the base station 100 acquires the communication quality from the communication terminal 200. With regard to the local cell, the measurement is performed on a signal received from the antenna within the local cell. Further, with regard to the adjacent cells, the measurement is performed on the cell based on information related to the adjacent cells received from the adjacent-cell information control unit 105 of the base station 100.

Subsequently, the usable band setting unit 103 performs the processing of Steps S1407 to S1421. First, in Step S1407, the communication quality difference between the respective adjacent cells and the local cell are calculated. Then, in Step S1409, for the adjacent cells having the same priority band, a list of the communication quality differences that are grouped is generated. FIG. 14 illustrates an example of such a list 1502. Then, in Step S1411, the head group of the list 1502 is specified as a determination subject, and in Step S1413, it is determined whether or not the communication quality differences with respect to all the adjacent cells within the group are larger than the threshold value. In the example of FIG. 14, of the communication quality differences Diff_RSRP(j) within a group 1, the communication quality difference (in the figure, 1.5 dB) related to the cell C42 is equal to or smaller than the threshold value (for example, 5 dB), with the result that the determination of Step S1413 regarding the group 1 is NO, and the procedure advances to Step S1417.

Then, in Step S1417, it is determined whether or not the determination has been finished for all the groups. When the determination has not been finished for all the groups, the procedure advances to Step S1419 to shift the determination subject to the next group and repeat the processing of Steps S1413 and S1415. In the example of FIG. 14, all the communication quality differences Diff_RSRP(j) included in a group 2 are larger than the threshold value (for example, 5 dB), and hence the priority band f3 for the group 2 is added to f1 to set f1+f3 as the usable band. After that, the procedure advances to Step S1417 to determine that the determination has been finished for all the groups here in the example of FIG. 14, and hence the procedure advances to Step S1421 to add, when there is an available band that is not the priority band for any of the cells, this band to the usable band as well. For example, f4 illustrated in FIG. 9 is added. With this operation, f1+f3+f4 is set as the usable band in the example of the communication terminal having the communication quality difference Diff_RSRP(j) of FIG. 14.

(Effects of the Fourth Exemplary Embodiment)

According to the above-mentioned configuration, even in the processing for adding the usable band, the same effect can be obtained as that of the third exemplary embodiment (see FIG. 12).

Fifth Exemplary Embodiment

Figure 15:
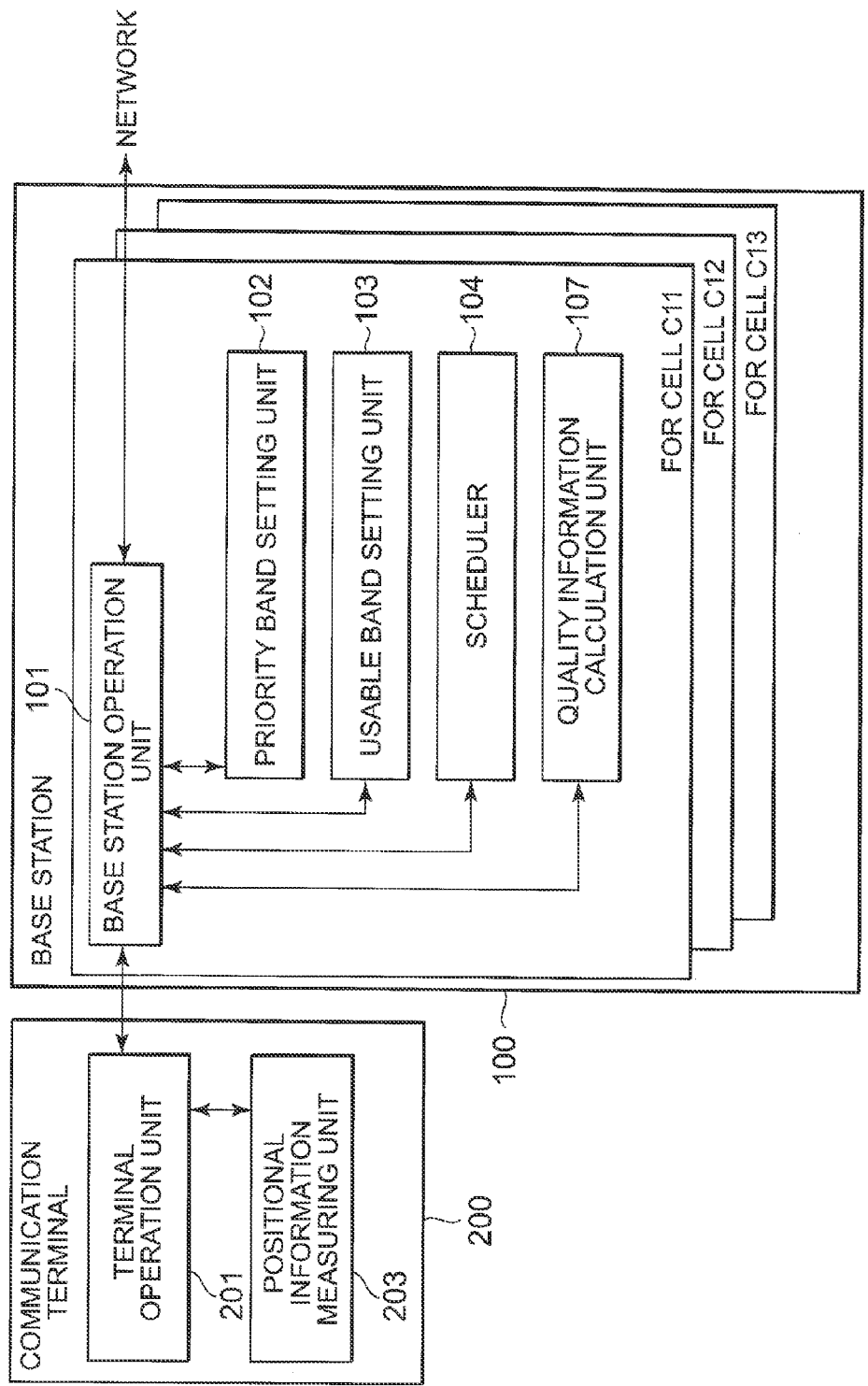
FIG. 15 is a block diagram illustrating a configuration of a radio communication system according to a fifth exemplary embodiment of this invention.

Next, a fifth exemplary embodiment of this invention is described in detail with reference to the accompanying drawings. FIG. 15 illustrates a configuration of a radio communication system according to this embodiment. Referring to FIG. 15, compared to the base station 100 according to the first exemplary embodiment of FIG. 4, the adjacent-cell information control unit 105 and the reference signal transmission unit 106 are deleted therefrom, and a quality information calculation unit 107 is added thereto. Further, the reception state measuring unit 202 is deleted from the communication terminal 200, and a positional information measuring unit 203 is added thereto.

Description is given of a difference from the first exemplary embodiment. In the fifth exemplary embodiment, the positional information measuring unit 203 of the communication terminal 200 has a function of measuring terminal positional information by using a GPS or the like and providing a report to the terminal operation unit 201. The terminal positional information of which the terminal operation unit 201 has been notified is transmitted to the base station 100.

Further, the quality information calculation unit 107 of the base station 100 has a function of retaining positional information on the base stations within the local cell and the adjacent cell. The quality information calculation unit 107 also has a function of calculating quality information on the local cell and the adjacent cell by using the terminal positional information received from the communication terminal 200 and the retained positional information on the base stations within the local cell and the adjacent cell. A method used in general suffices for the calculation of the quality information. For example, it is conceivable to create a table for converting the positional information into the quality information by summing up the quality information on the reference signal, which has been reported from the communication terminal for the purpose of a handover or the like, for each piece of the positional information on the communication terminal. In this embodiment, the quality information calculation unit 107 calculates for each cell reception power RSRP of the reference signals for the local cell and the adjacent cells as the quality information by using the above-mentioned table, and notifies the usable band setting unit 103 of the calculated reception power RSRP.

(Description of Operation)

The operation of this embodiment is the same as that of the first exemplary embodiment. Further, in this embodiment, the RSRP is used as the quality information, but it is conceivable that the positional information itself is used to determine which of the areas A1, A2, A11, and A12 of FIG. 8 the terminal belongs to and to determine the usable band.

(Effects of the Fifth Exemplary Embodiment)

According to this embodiment, it is not necessary to use the reference signal as the terminal positional information, and hence traffic is reduced to a lower level than in a case where the reference signal is constantly exchanged to confirm the communication quality. In addition to the same effect as that of the first exemplary embodiment, there is an effect that a communication load can be alleviated.

Other Exemplary Embodiments

Several exemplary embodiments of this invention are described above, but this invention is not limited to the above-mentioned embodiments. For example, in the above-mentioned embodiments, the description is given by taking the example of the uplink, but there is no limitation on whether to use the uplink or the downlink. Further, this invention may be applied to another system using a frequency division multiple access (FDMA) scheme that employs frequency-multiplexing. In the case of the downlink, power of the priority band is set equal to or higher than that of the other bands to thereby enable the suppression of the inter-adjacent-cell interference.

Note that, a system or a device that arbitrarily combines the separate features included in the above-mentioned first to fifth exemplary embodiments is also included in the scope of this invention.

Further, this invention may be applied to a system formed of a plurality of devices or maybe applied to a discrete device. In addition, this invention can be applied to a case where the processing illustrated in the flowchart of FIG. 6 or FIG. 11 is executed by a program for implementing the functions described in the above-mentioned embodiments which is supplied directly or remotely to the system or the device. Accordingly, the scope of this invention also includes a program that is installed on the base station and executed by a processor (not shown) within the base station in order to implement the functions of this invention, a medium that stores the program, and a server that allows the program to be downloaded therefrom.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, in consideration of the above-mentioned embodiments, this invention can include base stations disclosed in the following notes in addition to the base stations and the like disclosed in the claims.

(Note 1)

A base station, which performs radio communications with a communication terminal within a main communication area, including:
  a priority band setting unit that sets a main priority radio resource that can be used for the main communication area on a higher priority basis than for another communication area, and acquires a particular priority radio resource that can be used for at least one particular communication area adjacent to the main communication area on a higher priority basis than for another communication area; and
  a usable band setting unit that acquires a communication quality difference regarding the communication terminal between communication quality related to the main communication area and communication quality related to the at least one particular communication area, and sets the main priority radio resource to which at least one particular priority radio resource is added, as usable radio resources for the communication terminal when at least one condition that the communication quality difference is larger than a threshold value is fulfilled.

(Note 2)

A base station according to Note 1, further including a base station operation unit that receives positional information on the communication terminal,
  in which the usable band setting unit determines whether or not the main priority radio resource to which the particular priority radio resource is added is set as the usable radio resources for the communication terminal based on which area within the main communication area the communication terminal exists in.

(Note 3)

A base station according to Note 1, in which:
  the communication quality is a ratio of interfering power and noise power to reception power obtained when the communication terminal receives a reference signal for the main communication area (signal to interference plus noise ratio (SINR)); and
  the communication quality related to the main communication area is a ratio of interfering power and noise power to reception power obtained when the communication terminal receives a reference signal for the at least one particular communication area (SINR).

(Note 4)

A base station according to Note 1, in which:
  the communication quality related to the main communication area is a path loss calculated from a difference between reception power and transmission power of a reference signal for the main communication area; and
  the communication quality related to the at least one particular communication area is a path loss calculated from a difference between reception power and transmission power of a reference signal for the at least one particular communication area.

(Note 5)

A base station according to any one of Notes 1 to 4, in which the threshold value is updated depending on a communication load on the base station.

(Note 6)

A control program for a communication terminal, which performs radio communications with a base station that manages a main communication area, the control program being configured to:
  measure communication quality related to the main communication area and communication quality related to at least one particular communication area adjacent to the main communication area; and
  communicate to/from the base station by using a usable radio resource obtained by adding: a main priority radio resource set to be used for the main communication area on a higher priority basis than for another communication area; and at least one particular priority radio resource set to be used for the at least one particular communication area on a higher priority basis than for another communication area, when at least one condition that the communication quality difference between the communication quality related to the main communication area and the communication quality related to the at least one particular communication area is larger than a threshold value is fulfilled.

This application claims priority from Japanese Patent Application No. 2009-292017, filed on Dec. 24, 2009, the entire disclosure of which is incorporated herein by reference.

REFERENCE SIGNS LIST

100 base station
101 base station operation unit
102 priority band setting unit
103 usable band setting unit
104 scheduler
105 adjacent-cell information control unit
106 reference signal transmission unit
107 quality information calculation unit
200 communication terminal
201 terminal operation unit
202 reception state measuring unit
203 positional information measuring unit

The invention claimed is:
1. A base station, which performs radio communications with a communication terminal within a main communication area, comprising:

a priority band setting unit that sets a main priority radio resource that can be used for the main communication area on a higher priority basis than for a communication area adjacent to the main communication area, and acquires a particular priority radio resource that can be used for at least one particular communication area adjacent to the main communication area on a higher priority basis than for a communication area adjacent to the at least one particular communication area; and a usable band setting unit that acquires a communication quality difference regarding the communication terminal between communication quality related to the main communication area and communication quality related to the at least one particular communication area, and sets the main priority radio resource and at least one particular priority radio resource as usable radio resources for the communication terminal when at least one condition that the communication quality difference is larger than a threshold value is fulfilled.

2. The base station according to claim 1, wherein the usable band setting unit acquires, from the communication terminal, the communication quality of the communication terminal which is related to the main communication area and the communication quality of the communication terminal which is related to the at least one particular communication area.

3. The base station according to claim 1, wherein:
the communication quality related to the main communication area comprises reception power obtained when the communication terminal receives a reference signal for the main communication area; and
the communication quality related to the at least one particular communication area comprises reception power obtained when the communication terminal receives a reference signal for the at least one particular communication area.

4. The base station according to claim 1, wherein:
the communication quality related to the main communication area comprises a ratio between overall reception power and reception power obtained when the communication terminal receives a reference signal for the main communication area; and
the communication quality related to the at least one particular communication area comprises a ratio between the overall reception power and reception power obtained when the communication terminal receives a reference signal for the at least one particular communication area.

5. The base station according to claim 1, wherein the usable band setting unit sets a sum of the main priority radio resource and the particular priority radio resource as usable radio resource candidates, and deletes the particular priority radio resource from the usable radio resource candidates in a case where the communication quality difference is not larger than the threshold value.

6. The base station according to claim 1, wherein the usable band setting unit sets all radio resources that can be used for the main communication area as usable radio resource candidates, and deletes the particular priority radio resource from the usable radio resource candidates in a case where the communication quality difference is not larger than the threshold value.

7. The base station according to claim 1, wherein the usable band setting unit sets the main priority radio resource as the usable radio resource, and adds the particular priority radio resource to the usable radio resource in a case where the communication quality difference is larger than the threshold value.

8. The base station according to claim 1, further comprising a base station operation unit that receives positional information on the communication terminal,
wherein the usable band setting unit determines whether or not the main priority radio resource to which the particular priority radio resource is added is set as the usable radio resources for the communication terminal based on which area within the main communication area the communication terminal exists in.

9. The base station according to claim 1, wherein:
the communication quality is a ratio of interfering power and noise power to reception power obtained when the communication terminal receives a reference signal for the main communication area (signal to interference plus noise ratio (SINR)); and
the communication quality related to the main communication area is a ratio of interfering power and noise power to reception power obtained when the communication terminal receives a reference signal for the at least one particular communication area (SINR).

10. The base station according to claim 1, wherein:
the communication quality related to the main communication area is a path loss calculated from a difference between reception power and transmission power of a reference signal for the main communication area; and
the communication quality related to the at least one particular communication area is a path loss calculated from a difference between reception power and transmission power of a reference signal for the at least one particular communication area.

11. The base station according to claim 1, wherein the threshold value is updated depending on a communication load on the base station.

12. A communication terminal, which performs radio communications with a base station that manages a main communication area, comprising:
a reception state measuring unit that measures communication quality related to the main communication area and communication quality related to at least one particular communication area adjacent to the main communication area; and
a terminal operation unit that communicates with the base station by using a usable radio resource obtained by adding: a main priority radio resource set to be used for the main communication area on a higher priority basis than for another communication area; and at least one particular priority radio resource set to be used for the at least one particular communication area on a higher priority basis than for another communication area, when at least one condition that the communication quality difference between the communication quality related to the main communication area and the communication quality related to the at least one particular communication area is larger than a threshold value is fulfilled.

13. A usable radio resource setting method for setting a usable radio resource to be used to perform radio communications between a base station and a communication terminal,
the base station managing a main communication area adjacent to which at least one particular communication area exists, and the main communication area and the at least one particular communication area comprising a main priority radio resource and a particular priority radio resource, respectively, which can be used therefor on a higher priority basis than for another communication area, the usable radio resource setting method comprising:
- acquiring a communication quality difference regarding the communication terminal between communication quality related to the main communication area and communication quality related to the at least one particular communication area; and
- setting the main priority radio resource to which at least one particular priority radio resource is added, as usable radio resources for the communication terminal when at least one condition that the communication quality difference is larger than a threshold value is fulfilled.

14. A non-transitory computer-readable storage medium storing a control program for causing a base station to execute a process, which performs radio communications with a communication terminal within a main communication area, the control program being configured to:
- set a main priority radio resource that can be used for the main communication area on a higher priority basis than for another communication area;
- acquire a particular priority radio resource that can be used for at least one particular communication area adjacent to the main communication area on a higher priority basis than for another communication area;
- acquire a communication quality difference regarding the communication terminal between communication quality related to the main communication area and communication quality related to the at least one particular communication area; and
- set the main priority radio resource to which at least one particular priority radio resource is added, as usable radio resources for the communication terminal when at least one condition that the communication quality difference is larger than a threshold value is fulfilled.

15. A non-transitory computer-readable storage medium storing a control program for causing a communication terminal to execute a process, which performs radio communications with a base station that manages a main communication area, the control program being configured to:
- measure communication quality related to the main communication area and communication quality related to at least one particular communication area adjacent to the main communication area; and
- communicate with the base station by using a usable radio resource obtained by adding: a main priority radio resource set to be used for the main communication area on a higher priority basis than for another communication area; and at least one particular priority radio resource set to be used for the at least one particular communication area on a higher priority basis than for another communication area, when at least one condition that the communication quality difference between the communication quality related to the main communication area and the communication quality related to the at least one particular communication area is larger than a threshold value is fulfilled.

* * * * *